Figure 1:
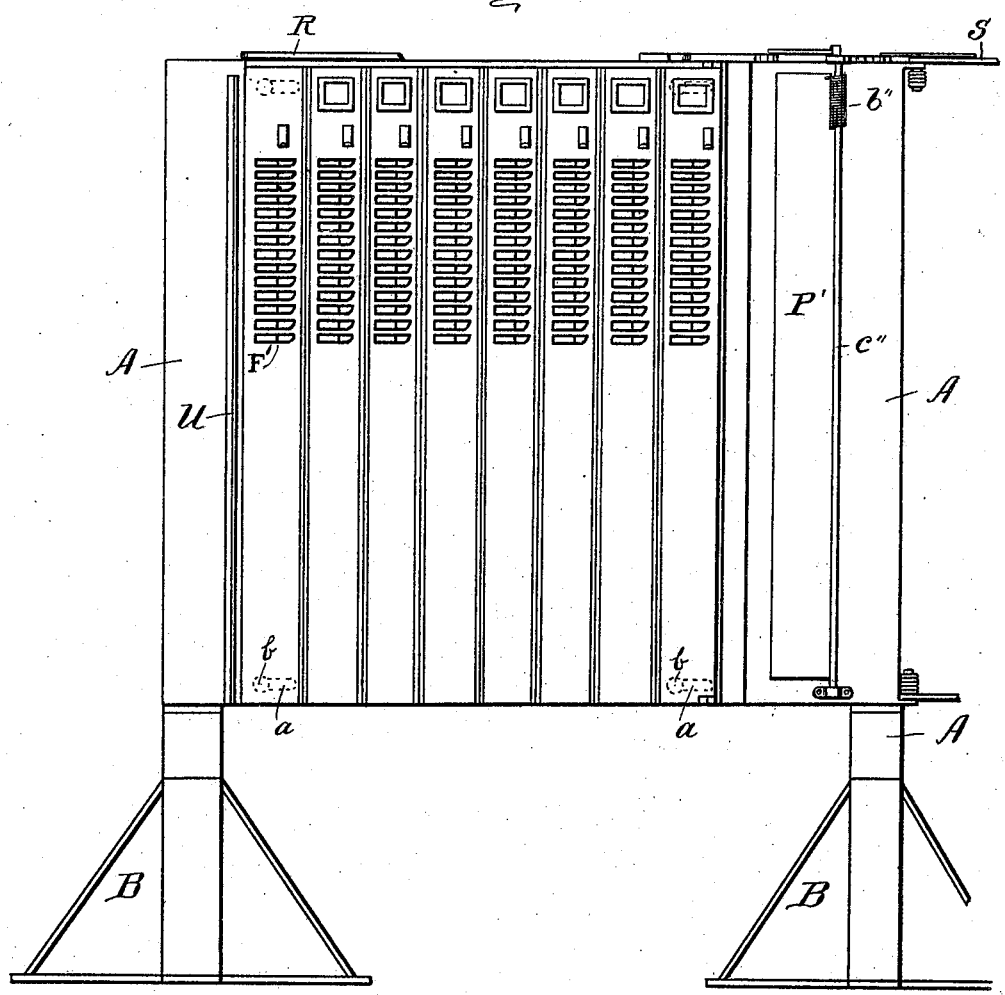

No. 692,976. Patented Feb. 11, 1902.
F. M. BORING & L. P. CHITWOOD.
VOTING MACHINE.
(Application filed Feb. 13, 1901.)

(No Model.) 6 Sheets—Sheet 1.

Witnesses.

Inventors.
Frank M. Boring
Lenard P. Chitwood
by Alfred M. Allen
Attorney.

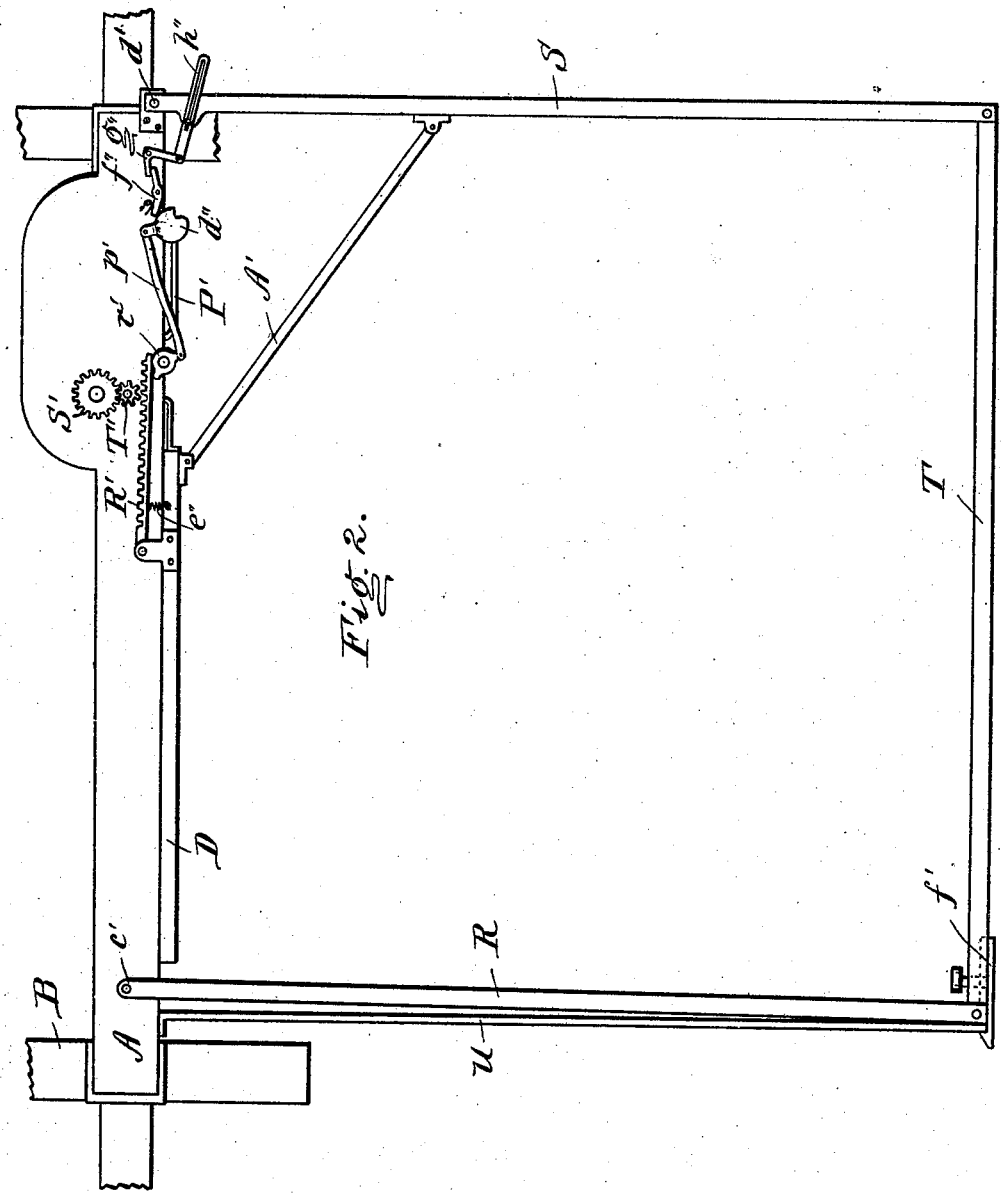

No. 692,976. Patented Feb. 11, 1902.
F. M. BORING & L. P. CHITWOOD.
VOTING MACHINE.
(Application filed Feb. 13, 1901.)
(No Model.) 6 Sheets—Sheet 3.
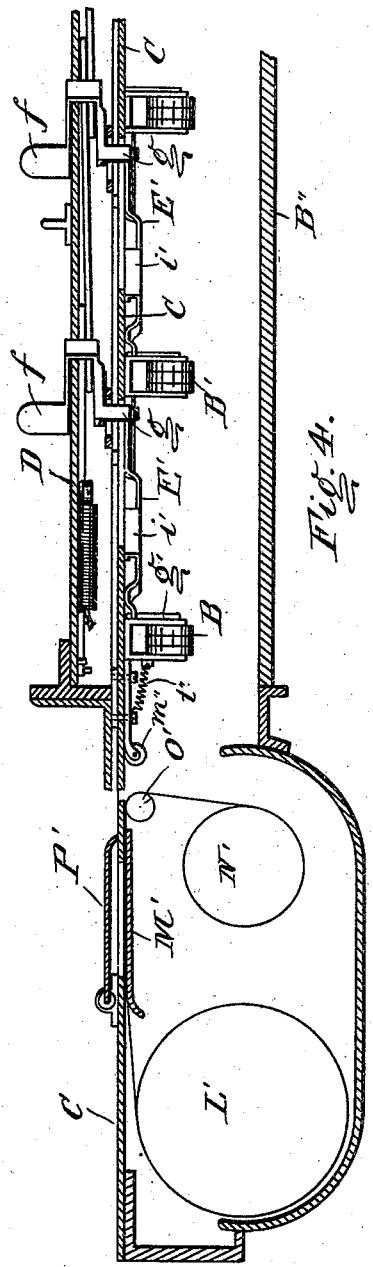
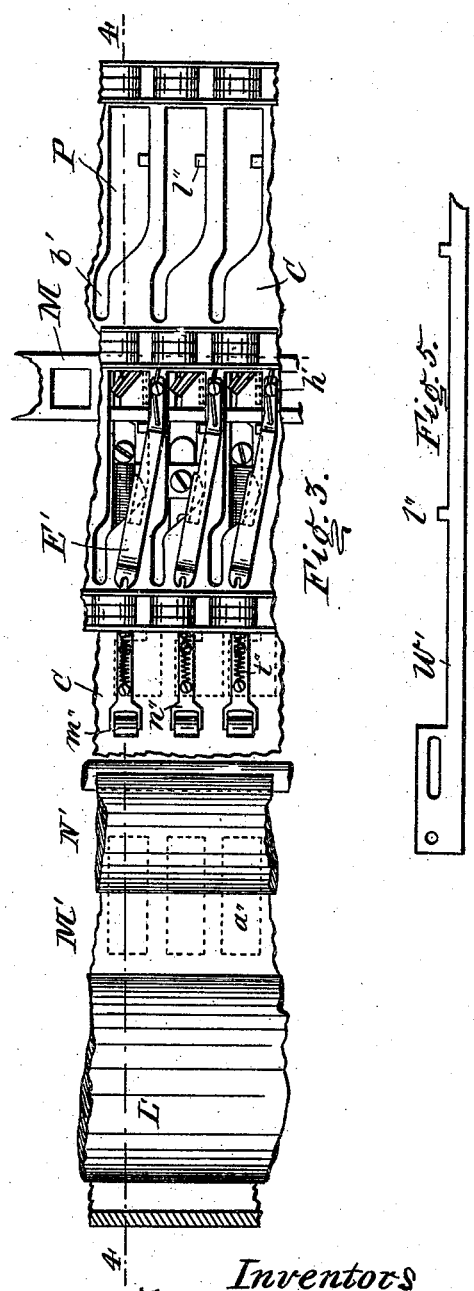
Witnesses.
Inventors No. 692,976. Patented Feb. 11, 1902.
F. M. BORING & L. P. CHITWOOD.
VOTING MACHINE.
(Application filed Feb. 13, 1901.)
(No Model.) 6 Sheets—Sheet 4.
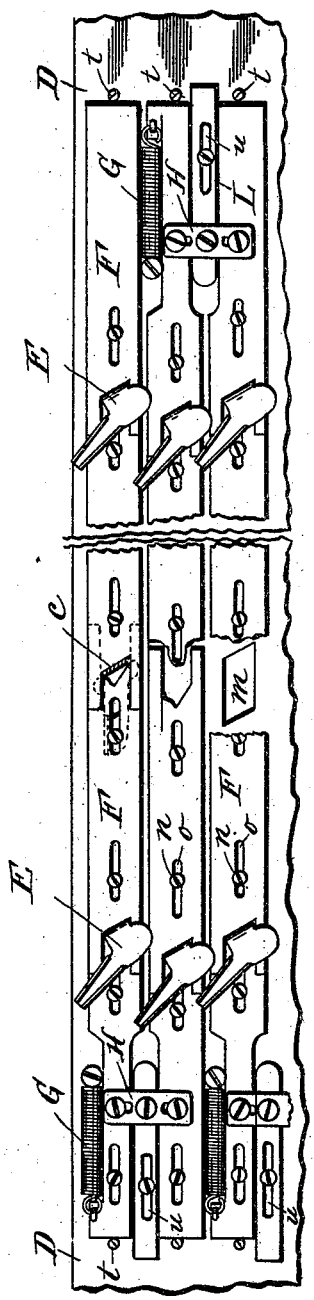
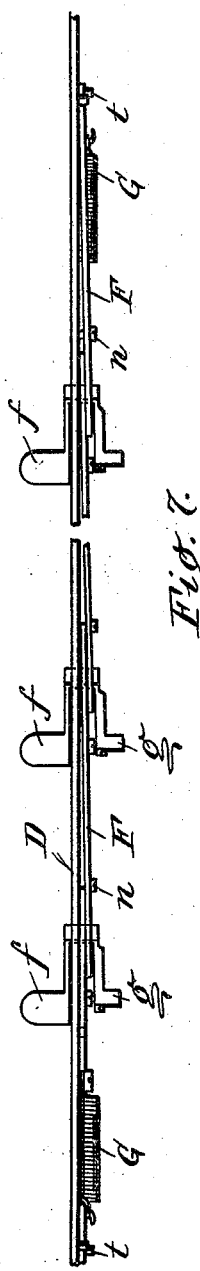

No. 692,976. Patented Feb. 11, 1902.
F. M. BORING & L. P. CHITWOOD.
VOTING MACHINE.
(Application filed Feb. 13, 1901.)
(No Model.) 6 Sheets—Sheet 5.
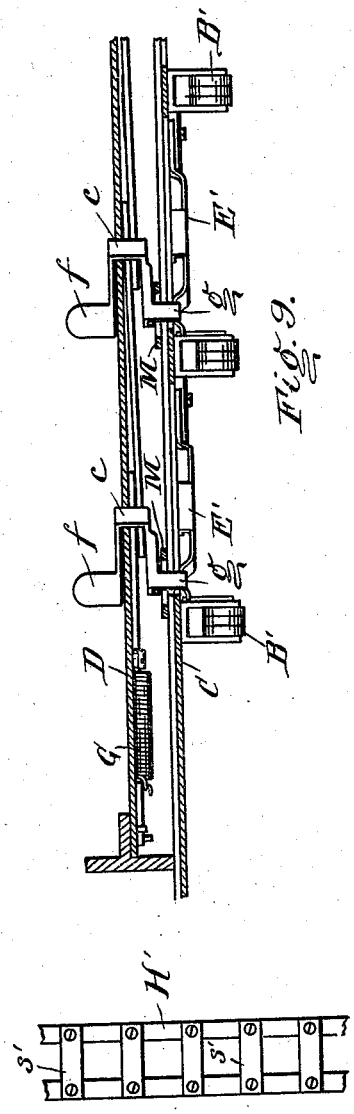
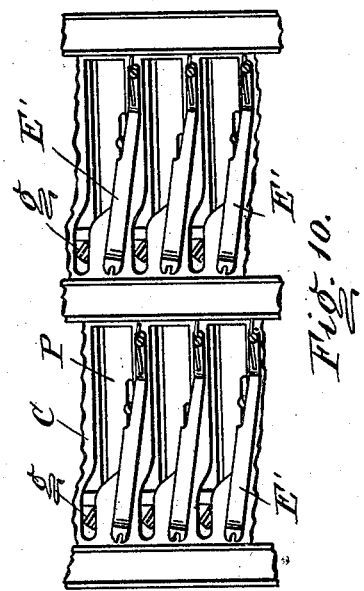
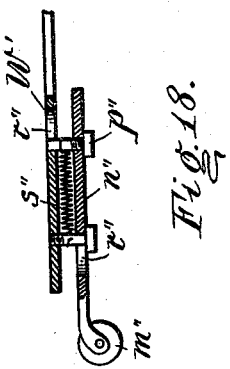
Witnesses.
Inventors
Frank M. Boring
Leonard P. Chitwood
by Alfred M. Allen
Attorney.

No. 692,976. Patented Feb. 11, 1902.
F. M. BORING & L. P. CHITWOOD.
VOTING MACHINE.
(Application filed Feb. 13, 1901.)
(No Model.) 6 Sheets—Sheet 6.
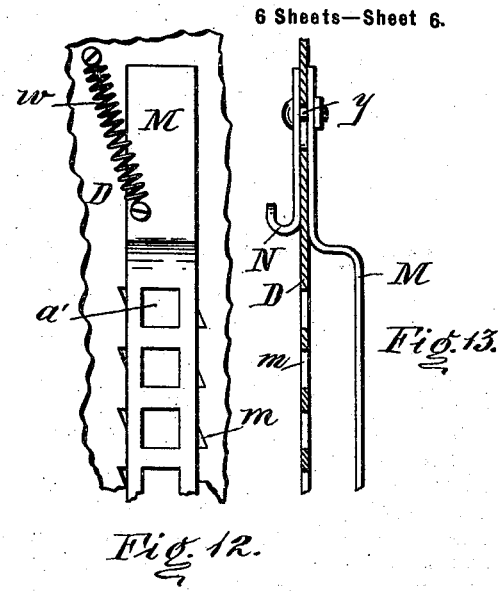
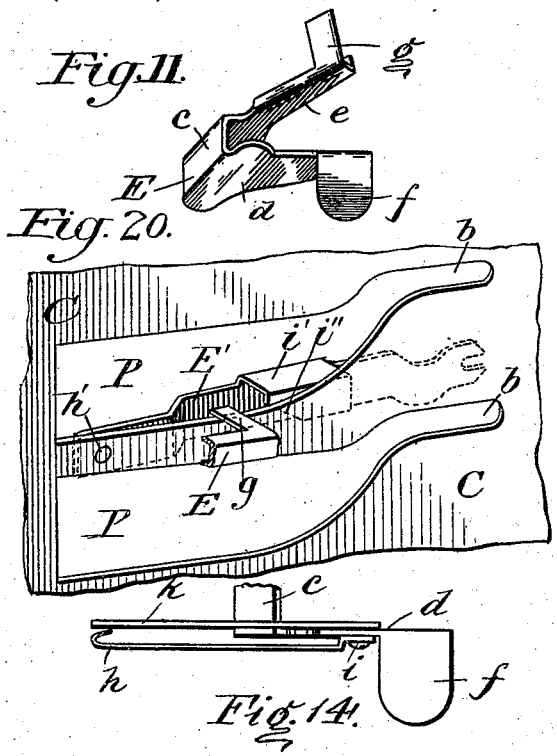
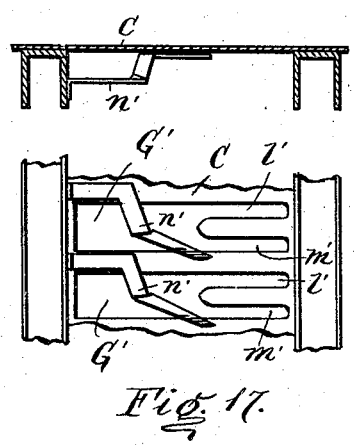
Witnesses.
Clarence E. Mellhope.
W. S. Kyle.
Inventors
Frank M. Boring
Leonard P. Chitwood
by Alfred M. Allen
Attorney.
THE NORRIS PETERS CO., PHOTO-LITHO., WASHINGTON, D. C.

UNITED STATES PATENT OFFICE.

FRANK M. BORING AND LEONARD P. CHITWOOD, OF DAYTON, OHIO, ASSIGNORS TO LEOPOLD RAUH, OF DAYTON, OHIO.

VOTING-MACHINE.

SPECIFICATION forming part of Letters Patent No. 692,976, dated February 11, 1902.

Application filed February 13, 1901. Serial No. 47,098. (No model.)

*To all whom it may concern:*

Be it known that we, FRANK M. BORING and LEONARD P. CHITWOOD, citizens of the United States, residing at Dayton, in the county of Montgomery and State of Ohio, have invented certain new and useful Improvements in Voting-Machines, of which the following is a full, clear, and exact description, reference being had to the accompanying drawings, forming part of this specification.

Our improvements relate to means for registering the selection by voters of various candidates to be elected at any election, especially under what is known as the Australian-ballot system, in which the ticket containing the names of all of the candidates is presented to the voter.

The improvements consist of a certain novel construction and arrangement of parts, to be hereinafter particularly pointed out and claimed, whereby the various requisites required by the laws of the different States relating to the method of voting and the secrecy of the selection to be made by the voter are complied with and in which provision is made for voting what are known as "straight" party-tickets, for the selection of individual names from any of the party-tickets, for voting for candidates whose names do not appear on the regular party-tickets, and for the exclusion of any voting for certain of the candidates when there are more than one class of voters who must use the machine and certain of the voters are not permitted to vote for certain of the candidates. Provision is also made to prevent voting for more than one candidate for a single office when only one is to be selected and to permit voting for a plurality of candidates when a plurality of names are to be selected, and to permit this plural selection, no matter how the names may be selected, whether all in the same horizontal or vertical line or scattered throughout the group of candidates. Provision is also made for the machine when not in use being at all times open to the inspection of the election officers, but when so open locked against any operation, and so that as the voter enters the voting-booth and is concealed from view the apparatus is unlocked, and as he leaves the booth the operating mechanism is actuated to automatically count and register the final selection of candidates by the voter, this registration and counting only taking place as the voter withdraws from the booth, so that he cannot change his selections until he is satisfied with his choice.

In the drawings, Figure 1 is a front elevation of our improved voting-machine as open to the election officers. Fig. 2 is a top plan view of same with the booth closed and the machine in operative condition. Fig. 3 is a rear elevation of a portion of the machine with the door inclosing the counters removed. Fig. 4 is a cross-section of same on the lines 4 4 of Fig. 3. Fig. 5 is a detail of the push-bar used in connection with the irregular voting. Fig. 6 is a rear view of a portion of the sliding plate which carries the voting levers or keys. Fig. 7 is a top plan view of same. Fig. 8 is a front view of one of the stop-bars or sliding blocks. Fig. 9 is a cross-section of a portion of the machine, showing the counters and the keys in the position before the voter enters the booth. Fig. 10 is a detail rear elevation of same with the counters removed. Fig. 11 is a perspective view of one of the voting levers or keys. Figs. 12 and 13 are respectively rear and side views of the straight-ticket bar. Figs. 14, 15, and 16 are detail views of the plates for holding the names of candidates. Fig. 17 is a rear elevation of the exclusion-plate. Fig. 18 is a detail of the cancelling device for the independent voting. Fig. 19 is a detail of the general exclusion-bar.

The voting-machine proper is mounted in a substantial framework A, provided with substantial feet B at the bottom to support the operating mechanism.

As already stated, the machine is designed to present to the voter the names of all of the candidates, which are arranged in suitable vertical rows, there being as many rows as there are tickets. In the device illustrated we have shown provision for seven different tickets of some forty names each. Of course as many more tickets and as many more names can be added in the construction of the machine as desired.

The operating mechanism is mounted on a flat plate C, extending the entire width and length of the machine and secured in any suitable way to the framework. Mounted to slide horizontally in any suitable way on this fixed plate C is a sliding plate D. The method we prefer of mounting this sliding plate on the fixed plate is by forming horizontal slots $a$ of suitable length in the fixed plate and providing grooved rollers $b$, secured to the sliding plate at the four corners to run in these slots back and forth.

E represents the voting levers or keys, one provided for each candidate on the ticket. These voting-levers, a perspective view of one of which is shown in Fig. 11, are bent to form a flat shank $c$, with front and rear plates $d$ $e$ and finger-plate $f$, by means of which the voting-levers are pulled down, as hereinafter described, by the voter, and a rear arm $g$. For the purpose of conveniently mounting the names of the candidates on these voting-levers we provide as shown in Figs. 14, 15, and 16.

$h$ is a small plate with a central rectangular opening to carry behind it a printed slip with the name of the candidate thereon, and this plate $h$ is secured to the front plate $d$ of the voting-lever by the screw $i$. $k$ is a back plate to hold the printed slip formed with the slot $l$ to fit over the edge of the shank $c$ of the lever. The space between these two plates holds the printed slip, and the turned-under edge of the plate $h$ is serrated, so that the printed slip cannot be withdrawn without tearing it.

The voting-levers E are mounted on the sliding plate D with the flat shanks $c$ of the levers passing through the slots $m$ in the sliding plate. These slots $m$ are made of sufficient width and length to allow for the movement of the voting-levers, as hereinafter described. Mounted on the rear of the sliding plate by the screws $n$, passing through the slots $o$, are a series of stop-bars F. These stop-bars are provided with the beveled slots $p$ and $r$ at each end, the slot $r$ being provided at its inner end with a curved shoulder $s$. These stop-bars F are arranged horizontally across the machine, with the slot $p$ in one bar overlapping the slot $r$ in the next succeeding bar and the shanks $c$ of the voting-levers passing through the openings between each of the overlapping stop-bars. The outer stop-bars in each line abut up against screws $tt$ on the sliding plate D, and the arrangement is such that in each line there is space for the partial rotation of one of the voting-levers. The edge of the shank portion of the voting-lever when the lever is pulled down bears against the shoulder $s$ on the stop-bar and pushes the bar over until the voting-lever rests in the notch below the shoulder $s$. As we have stated, these stop-bars are so arranged that there is just room between the end screws $tt$ for the rotation of one of the voting-levers. In this way the voter having pulled down one of the levers in a horizontal line cannot operate any of the other levers in that line. Coiled springs G, attached between the stop-bars F and the sliding plate D, hold these bars together and hold the voting-levers in horizontal position. It frequently happens, however, that there are a plurality of candidates to be selected for a certain particular office, and provision must be made to permit the voter to select his candidates from any place they may happen to be on the list. For example, where a plurality of names are to be selected he may wish to vote names that appear in the same horizontal line on a plurality of the lists, and ordinarily the stop-bars F would prevent such a selection. In order to overcome this difficulty, we connect the alternate ends of the rear series of stop-bars by the slotted links H, and we pivot these links at their middle points to the bars L, which rest between the side edges of the stop-bars, at the ends, and are guided by the pins and slots $u$. This mere coupling together of the horizontal series of stop-bars does not in itself effect the operation of the stops, the screws $tt$ at the ends of the stop-bars allowing room for the operation of one voting-lever, and only one. When it is desired to select two candidates for a particular office, we remove the screw $t$ at the end of the first row and at the beginning of the second row, and at the same time we secure the bar L, by means of a pin, in a suitable opening in the sliding plate D. With this construction the voter can now operate two voting-levers in a single horizontal line, and when he does this, so as to fill out the two spaces in that line, the link H will carry back the next row of stop-bars the two spaces, and hence prevent any operation of the voting-levers in the second row. If the voter selects only one name in one row, there will be space for him to select the other name in the second row. When three candidates are to be selected, all the intermediate stop-screws $t$ are removed except the one at the beginning of the first row and the end of the third row, and three of the horizontal series of stop-bars are secured together by fixing the bars L in the proper position on the plate D, and so on for as many candidates as there are to be selected for any particular office.

Mounted vertically on the rear of the sliding plate D, one for each ticket, are a series of straight-ticket bars M. These straight-ticket bars are secured to the sliding plate by two bolts $y$ at top and bottom, the heads of the bolts passing through vertical slots in the sliding plate, and the upper end of these straight-ticket bars carry the hooks N, by means of which these bars may be drawn down within the limits of the slots, while the bars are normally held up by the spring $w$, attached between the straight-ticket bar and the sliding plate. These straight-ticket bars are provided with a series of rectangular openings $a'$, one for each name on the particular list, and the arms $g$ of each voting-lever pass through these rectangular openings, so that it will be evident that by pulling down any particular straight-ticket bar all of the voting-levers in that particular vertical list will also be pulled down or operated. This straight-ticket bar thus merely serves to operate all of the voting-levers of any particular ticket, instead of requiring the voter to pull down each particular lever in the vertical row. When any one of these straight-ticket bars are pulled down, all of the other straight-ticket bars are prevented from operating by the stop-bars, as heretofore described, for the operation of any particular voting-lever in a horizontal line. The straight-ticket bar after operation is returned to its normal position by the spring $w$, the rectangular openings $a'$ being of a size to permit this movement, while the shanks of the voting-levers, catching behind the shoulders $s$, formed on the stop-bars, hold the voting-levers down until released, as will be hereinafter described.

It will be understood from the description so far that the individual voting-levers, straight-ticket levers, and the stop-bars are thus all mounted on the sliding plate D and will move with it, as hereinafter described.

The fixed plate C is provided with a series of cam-openings P, one for each voting-lever. These cam-openings are provided with a narrow slot $b'$, through which the arm $g$ of the voting-levers are inserted, the position of the voting-levers with relation to the fixed plate being as shown in Figs. 9 and 10, when the voting-machine is in its normal locked position before the voter enters the booth. In this position, with the ends of all the voting-levers confined in the narrow slot in the cam-openings P in the fixed plate C, all of the voting-levers will be locked from any operation. When the sliding plate, however, is moved laterally by any convenient means as the voter enters the booth, the sliding plate will carry the voting-levers into the position shown in Figs. 3 and 4 at the other end of the cam-openings P, so that when in that position any of the voting-levers can be operated or pulled down within the limits provided by the stop-bars heretofore described. The method we have illustrated of shifting this sliding plate to unlock the voting-levers is more particularly shown in Figs. 1 and 2.

R S are rods pivoted on top of the framework A of the machine at $c'$ $d'$. Pivoted to the ends of these two rods S R and connecting them together is another rod T. Curtains are suspended from the rods S and T, while there is secured a permanent end screen U underneath the rod R. It will be understood that these curtains, together with the end screen U, will form a voting-booth within which the voter will be entirely concealed from the election officers. Coiled springs are mounted at the pivotal points of the rods R and S at $c'$ and $d'$, whose tendency is to normally hold this framework in the position shown in Fig. 1, with the screens depending from the rods S T folded together to the right of the machine. Secured to a suitable bracket depending from the front screen-rod T is a hook $f'$, and the voter approaching the voting-machine takes this hook and pulling out the screens secures the hook over the outer edge of the end screen U, as shown in Fig. 2, thus inclosing himself and the voting-machine behind the screens. The sliding plate D is coupled by a link $A'$ to the screen-rod S, and as the voter thus opens out the screens the sliding plate D is shifted to the left. This shifting of the plate carries all that is attached to it to the left and with it carries the voting-levers to the wide end of the slots P in the fixed plate D. In this position the voting-levers are in position to be actuated.

Secured to the rear surface of the fixed plate C in close proximity to the narrow end of the slots P, one for each slot and voting-lever, are a series of counters B for registering the operations of the voting-levers and the selection of the various candidates. Any of the well-known forms of counters can be used for this purpose and we have not illustrated the particular kind of counter, as these counters form no part of our invention. These counters each have a lever-arm $g'$, which engage in a suitable slot in the ends of the actuating-levers E′, which are pivoted at $h'$ to the fixed plate C. These actuating-levers E′ are provided with a wing $i'$, which is bent over and formed with a beveled lower edge $i''$, and these levers are held by suitable springs with the beveled edge of this wing portion extending a short distance across the lower end of the cam-surface of the slots P. When the voter leaves the voting-booth and the voting-screen is thrown to the right, as above described, the connecting-link $A'$ draws the sliding plate to the right and brings the ends of all such voting-levers as may have been actuated against the beveled edge of the shoulders on the actuating-levers E′. This movement raises up these levers and the movement is registered on the counter. The further movement of the sliding plate carries the ends of the key-levers up into the narrow portion $b'$ of the slots P, and the actuating-levers E′ are returned by their respective springs to their normal position as soon as the ends $g$ of the key-levers are beyond the wing portion of the actuating-levers E′.

It frequently happens at any particular election a certain class of voters are not permitted to vote for certain of the candidates. Especially is this true in those States where a limited suffrage has been granted to women. In order, therefore, that the election officers may prevent voting for certain of the candidates when desired, we provide a supplemental series of levers arranged in a vertical series on the left of the keyboard, as shown at F′ in Fig. 1. These key-levers are arranged and are of the same shape and operation as the other voting-levers of the machine. The only difference is that there are no counters for the operations of these levers, and the slot within which they work is as shown in Fig. 17. These slots G′ are arranged with their broad edge in the opposite direction from the cam-slots P and are provided with two narrow slots $l'$ and $m'$. With this construction when the sliding plate is in the position open to the election officers these exclusion-keys can be operated or pulled down. Thus if the election officers desire, as occasion may require, to include or restrict certain voters from balloting for nominees to certain offices the corresponding exclusion key-lever is pulled down, locking the entire horizontal row of names. Now when the booth is closed and the sliding plate moved laterally the end of these keys will be carried within the lower slot $m'$, and they cannot be moved so long as the voter is in the booth, while this actuation of the exclusion-keys by the election officers will have so moved the stop-bars F as to prevent any voting in the particular lines sought to be excluded.

$n'$ is a small flat spring which extends down across the slot G' to guide back the end of the exclusion key-lever to its normal position when the sliding plate returns to its normal position with the closing of the booth. If none of the exclusion key-levers have been operated, the movement of the sliding plate when the voter enters the booth carries the end of the lever into the upper slot $l'$, so that the voter cannot actuate them. As it frequently happens that there are only two classes of voters at the election, so that the same names will have to be excluded every time one of the excluded class desires to vote, in addition to the individual exclusion key-levers we provide a general exclusion-bar H', which is mounted and operated in the same way as the straight-ticket bars, except that the rectangular openings through which the ends of the exclusion-keys pass are formed by the removable bars $s'$. Prior to the holding of an election such number of the bars $s'$ may be removed by the proper authorities to conform to the tickets in nomination and the election laws, so that by one operation by the election officer only such exclusion or restricting key-levers are actuated as are restrictive in conformity with the occasion.

In order to permit independent voting—that is, to allow the voter to vote for candidates whose names are not on any of the tickets—we provide as follows:

On the right of the voting-machine frame, inclosed in a suitable case, we mount, vertically, a roll of paper L', the web of paper passing over the vertical tablet-plate M', and around the glide-roller O' to the storage-roll N'. These rolls and the tablet-plate M' extend the full length of the tickets, and the portion of the fixed plate C over the tablet-plate M' is cut away to leave rectangular openings $a''$ for each horizontal line of candidates to permit the voter, if he chooses, to write the name of his choice on the strip of paper. These openings $a''$ for the individual voting are normally closed by the door P', pivoted at the top and bottom of the case and held shut by the spring $b''$. Mounted on top of the pivot-rod $c''$ of this door P' is a notched disk $d''$. The arm of this disk is coupled by the connecting-link $p'$ with the cam-wheel $r'$, mounted on top of the casing on a suitable pivot-pin. The cam-wheel $r'$ contacts with the outer end of the rack R', pivoted to the upper edge of the sliding plate D. The journal of the storage-roll N' at its upper end carries, mounted thereon, the gear S', which meshes with the pinion T', mounted on top of the casing in close proximity to the rack R'. The rack R' is normally held out of engagement with the pinion T' by the small spring $e''$.

$f''$ is a dog held by a spring in engagement with the notched disk $d''$, with its outer end in contact with the bell-crank lever $g''$, which bell-crank lever is in turn connected by the slotted link $h''$ with the booth-rod S.

Now when the voter desires to vote an independent ticket he opens the door P', so that he can write the names in the proper spaces on the web of paper from the roll L'. When the door is opened wide enough to allow access to this web of paper, the rotation of the notched disk $d''$ brings the notch thereon into engagement with the dog $f'$ and locks the door open. This movement of the disk $d''$ rotates the cam $r'$ and throws the rack R' into engagement with the pinion T'. As the voter leaves the booth, as heretofore described, the sliding plate D is moved to the right and the rack R' revolves, by the gearing S' and T', the storage-roll N' to wind up the web of paper with the written names thereon. As the booth-rod S is carried around to the right, as heretofore described, the pin on the upper edge of the rod S which engages the slot in the link $h''$ reaches the end of this slot, rotates the bell-crank lever $g''$, which in turn throws the dog $f''$ out of engagement with the notch in the disk $d''$, and the door P' is thrown shut by the action of the coiled spring $b''$.

In order to prevent the voter after he has voted for independent names on the web of paper from the roll L' from afterward voting for some of the regular candidates for the particular office, or rather to cancel his independent choice should he afterward conclude to vote for any of the regular candidates, we provide as follows:

W' represents a series of sliding bars extending horizontally across the voting-machine, one for each horizontal list of candidates, and provided with the lugs $l''$, the bars being so mounted that these lugs $l''$ will extend across the lower edge of the cam-slots P in the plate C. The ends of these bars W' nearest the storage-roll N' carry the canceling devices $m''$, which are preferably serrated rollers or ink-rollers mounted on arms $n''$, secured to the bars W' by the pins $p''$. The pins $p''$ are mounted in slots $r''$ in the arms $n''$ and bar W and they are normally held to the right by the spring $s''$. The canceling devices $m''$ are located but a short distance from the roll O'', over which the web of paper from the roll L' passes, and if the voter, in addition to writing the names on the web of paper, votes for another candidate in that horizontal line the end of the key-lever *g* when the sliding plate D is actuated, as heretofore described, will contact with the lug *l''* and shift the particular bar or bars W' to the left, carrying the canceling devices *m''* in such line against the web of paper. The canceling device is mounted in the manner heretofore described, as shown in Fig. 18, in order that the canceling device shall at once come in contact with the web of paper and be held there under the movement of the bar W'. In this way the election officers can know at once what ballots cast for the independent candidate shall be counted.

T'' is a spring which normally holds the various bars W' to the left out of contact with the web of paper.

In order to prevent access to the working parts by any one except those duly authorized, the back of the case is inclosed by a cover or door B''. This door preferably has locks at the top and the bottom, so that separate election officers may retain the respective keys, and the door can only be opened by the use of both keys. Before the election commences the machine is duly inspected by the election officers and all the counters are set to zero. The door B'' is then locked and any access to the mechanism is prevented until the close of the election, and the door is again opened by the judges and the result as indicated by the counters duly entered in the records of the election, as provided for by the law.

Having thus described our invention, what we claim, and desire to secure by Letters Patent, is—

1. In a voting-machine, a plurality of voting-levers, a sliding plate upon which said levers are mounted, a fixed plate provided with a plurality of slots through which the ends of said levers project, a series of registering-counters mounted on said fixed plate, and actuating-levers therefor pivoted to the fixed plate and extending over said slots, whereby the movement of the sliding plate in one direction will cause all the operated voting-levers to contact with their respective actuating-levers to register the operation, substantially as shown and described.

2. In a voting-machine, a plurality of voting-levers, a sliding plate upon which said levers are mounted, a fixed plate provided with a plurality of cam-slots contracted at one end, through the contracted ends of which said levers project to lock same from operation, means for sliding said plate to unlock the voting-levers, registering mechanism extending over the lower edge of said cam-slots and cam-surface therefor, to register the operated voting-levers and return same to their normal position upon the return movement of said sliding plate, substantially as shown and described.

3. In a voting-machine, a plurality of voting-levers, with flat shanks, and a series of sliding blocks between the abutting ends of which the flat shanks of the voting-levers pass, with stops to limit the movement of the sliding blocks and prevent the operation of more than one voting-lever at a time, and shoulders on one of the abutting ends of said sliding blocks to retain the operated lever until positively released, substantially as shown and described.

4. In a voting-machine, a plurality of pivoted voting-levers arranged in rows and provided with flat shanks, a plate upon which said voting-levers are mounted, a series of interfering-blocks in corresponding rows mounted on said plate, with the flat shanks of the voting-levers inserted between the abutting ends of said blocks, means for uniting a plurality of rows of interfering-blocks in series, and stops at the beginning and at the end of said united series to limit the movement of said blocks as a whole, substantially as shown and described.

5. In a voting-machine, a plurality of pivoted voting-levers arranged in rows and provided with flat shanks, a plate upon which said voting-levers are mounted, a series of interfering-blocks in corresponding rows mounted on said plate, with the flat shanks of the voting-levers inserted between the abutting ends of said blocks, links coupling together the alternate ends of said rows of blocks, stops for limiting the movement of the blocks, and means for pivoting said links to the said plate, whereby the movement of one row of blocks will be transferred to the successive rows coupled by the links, substantially as shown and described.

6. In a voting-machine, the combination, with voting-levers and a sliding plate upon which said levers are mounted, of a folding framework, to form a booth when opened out, and connecting mechanism between said booth and sliding plate, whereby the movement of the booth-frame will actuate said sliding plate, substantially as shown and described.

7. In a voting-machine, the combination, will a roll of paper, and means for propelling the strip of paper therefrom, a plurality of voting-levers, a sliding plate upon which said voting-levers are mounted, a closing device for preventing access to said paper-roll, and mechanism intermediate said sliding plate and closing device, whereby when said closing device is released, said paper strip shall be propelled from the roll with the movement of the sliding plate, substantially as shown and described.

8. In a voting-machine, the combination, with a roll of paper, and means for propelling the strip of paper therefrom, a plurality of voting-levers, a sliding plate upon which said voting-levers are mounted, a door for preventing access to said paper roll, and mechanism intermediate said sliding plate and door, whereby when said door is open, said paper strip shall be propelled from the roll with the movement of the sliding plate, substantially as shown and described.

9. In a voting-machine, the combination, with a roll of paper, and means for propelling the strip of paper therefrom, voting mechanism for indicating and registering the selection of candidates, and a canceling device arranged to impinge on said paper strip, and means for actuating said voting mechanism and canceling device simultaneously, whereby any selection of candidates by the voting-levers will cancel the name of any candidate for the same office written on said strip of paper, substantially as shown and described.

10. In a voting-machine, the combination, with a roll of paper, and means for propelling the slip of paper therefrom, a plurality of voting-levers, a sliding plate upon which said voting-levers are mounted, canceling-bars, one for each list of candidates for the same office, mounted on said sliding plate, whereby said canceling-bars may be made to impinge on said paper strip, substantially as shown and described.

11. In a voting-machine, the combination, with a roll of paper, means for propelling the strip of paper therefrom, of a plurality of pivoted levers, a sliding plate upon which said levers are mounted, a plurality of sliding canceling-bars, one for each series of voting-levers for candidates for the same office, with lugs on said canceling-bars projected into the pathway of said voting-levers, when same are actuated, and means for sliding said plate, whereby the canceling-bars in the pathway of said actuated voting-levers may be caused to impinge on said paper strip, substantially as shown and described.

12. In a voting-machine, the combination, with a roll of paper, writing-tablet, and storage-roll, a plurality of voting-levers, a sliding plate upon which said voting-levers are mounted, a door to prevent access to said writing-tablet, gear on said storage-roll, and rack-bar pivoted to said sliding plate, normally out of contact with said gear, connecting mechanism between said door and rack-bar, whereby when said door is open, said rack-bar may be brought into connection with said gear for the actuation of same with the movement of the sliding plate, substantially as shown and described.

13. In a voting-machine, the combination, with a roll of paper, writing-tablet, and storage-roll, a plurality of voting-levers, a sliding plate upon which said voting-levers are mounted, a door to prevent access to said writing-tablet, gear on said storage-roll, and rack-bar pivoted to said sliding plate, normally out of contact with said gear, connecting mechanism between said door and rack-bar, whereby when said door is open, said rack-bar may be brought into connection with said gear for the actuation of same with the movement of the sliding plate, dog to hold said door open, and means for releasing said dog to allow the door to close as the sliding plate approaches the limit of its movement, substantially as shown and described.

14. In a voting-machine, a plurality of voting-levers, a sliding plate upon which said levers are mounted, a plurality of supplemental levers similarly mounted, and a series of sliding blocks between the abutting edges of which said voting and supplemental levers pass, with stops to limit the movement of the blocks, a fixed plate with slotted openings therein, having two contracted portions at top and bottom, through which slots the ends of the supplemental levers pass, and a movable bar provided with slots corresponding to the number of said supplemental levers, through which said levers pass, the crossbars forming said slots being removable, whereby with the actuation of said movable bar, any number of said supplemental levers may be actuated as desired, simultaneously, substantially as shown and described.

15. In a voting-machine, a plurality of voting-levers, a sliding plate upon which said levers are mounted, a plurality of supplemental levers, similarly mounted, and a series of sliding blocks between the abutting edges of which said voting and supplemental levers pass, with stops to limit the movement of the blocks, a fixed plate, with slotted openings therein, having two contracted portions at top and bottom through which slots the ends of the supplemental levers pass, whereby said supplemental levers shall be locked when the voting-levers are unlocked, substantially as shown and described.

FRANK M. BORING.
LEONARD P. CHITWOOD.

Witnesses:
ROBERT P. HARGITT,
GEO. B. WEIDLER.